United States Patent [19]

Sakamura et al.

[11] Patent Number: 4,499,647
[45] Date of Patent: Feb. 19, 1985

[54] BLIND NUT FASTENING METHOD

[76] Inventors: Yoshikazu Sakamura, 6-24, Uehonmachi Nishi 2-chome; Mitsue Majima, 2-1, Tanimachi 7-chome, both of Minami-ku, Osaka, Japan

[21] Appl. No.: 415,282

[22] Filed: Sep. 7, 1982

[30] Foreign Application Priority Data

May 11, 1982 [JP] Japan .................................. 57-79438

[51] Int. Cl.³ ........................ B21D 39/00; B23P 11/00
[52] U.S. Cl. .................................. 29/509; 29/522 A; 29/526 A; 411/34; 403/277
[58] Field of Search .................. 29/509, 522 A, 522 R, 29/510, 526 A; 411/34; 403/277

[56] References Cited

U.S. PATENT DOCUMENTS

| 2,188,422 | 1/1940 | Waner | 411/34 |
| 2,535,403 | 12/1950 | Froggatt | 411/34 X |
| 2,670,021 | 2/1954 | Tarresen et al. | 411/34 |
| 3,071,399 | 1/1963 | Cronin | 29/523 UX |
| 3,085,463 | 4/1963 | Hallock | 411/34 |
| 3,107,572 | 10/1963 | Orloff | 411/34 |
| 3,148,578 | 9/1964 | Gapp | 411/34 |
| 3,181,338 | 5/1965 | Zetterlund | 411/34 X |
| 3,322,449 | 5/1967 | Becker | 411/34 X |
| 3,461,771 | 8/1969 | Briles | 411/34 |

FOREIGN PATENT DOCUMENTS 1540719 8/1968 France .................................. 411/34

Primary Examiner—Charlie T. Moon
Attorney, Agent, or Firm—Griffin, Branigan & Butler

[57] ABSTRACT

A blind nut is provided for coupling with an object article having a bore, wherein the neck portion of said nut is nested in use. The peripheral side of said bore is immovably attached to a neck portion of said nut by a press deforming means. The blind nut has a particular neck section and there is a tool specifically designed for said section.

2 Claims, 12 Drawing Figures

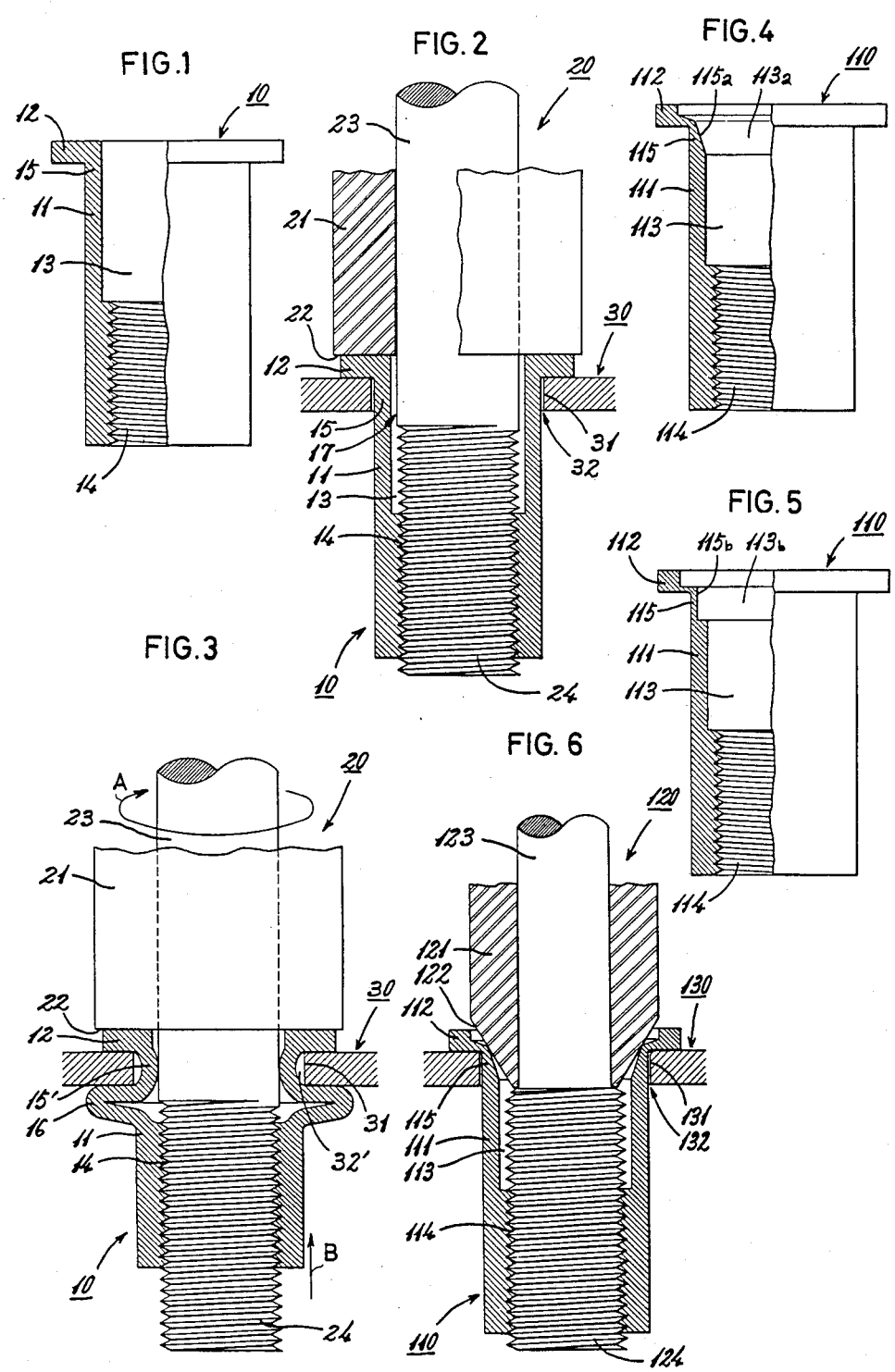

BLIND NUT FASTENING METHOD

BACKGROUND OF THE INVENTION

This invention relates to blind nut fastening methods for fastening blind nuts, to an object article as well as to the blind nuts and tools in use for working said methods.

A prior art blind nut 10, as shown in FIG. 1, includes a tubular body 11 in a uniform outer diameter, a flanged head portion 12, an inner bore 13, and a female thread portion 14 in a smaller diameter than the rest of said bore 13.

Blind nut 10 is made to engage with a lower end of a fastening tool 20 as shown in FIG. 2, then set in a lower aperture 31 of an object article 30 made by thin plate, and operated for fastening as shown FIG. 3.

This fastening tool 20 is also conventional and includes a sleeve 21 with a thrust surface 22 normal to the axial direction, and a spindle 23 independently rotatably disposed through said sleeve 21. The lower portion of spindle 23, projecting from the lower end of sleeve 21, is provided with a male thread bit 24, which is sufficiently longer than female thread portion 14 of blind nut 10.

Prior to insertion of blind nut 10 into lower aperture 31, fastening tool 20 is used such that thread bit 24 is meshed with female thread portion 14 of blind nut 10, so that the lower portion of spindle 23 can be fitted. As the result, the upper surface of head portion 12 is attached on lower thrust surface 22 of sleeve 21. Next, blind nut 10 in couplement with spindle 23 is inserted into a lower aperture 31 of the object article 30, when the lower surface of the head portion is seated on the upper surface of a lower aperture surrounding portion. The inner diameter of lower aperture 31 is slightly larger than the outer diameter of tubular body 11 of blind nut 10, thereby to facilitate insertion of blind nut 10 into aperture 31. As the result, when blind nut 10 is inserted into aperture 31, a slight gap is produced between the neck portion 15 adjacent to head portion 12 of blind nut 10 and the inner peripheral side of lower aperture 31.

After blind nut 10 is set as in the foregoing, spindle 23 independently of fastening tool 20 is rotated in arrow direction A such that male thread bit 24 can be downwards directed along female thread portion 14.

In order for blind nut 10 not to turn together with spindle 23 by torque transferred to tubular body 11 by means of female thread portion 14 and male thread bit 24, head portion 12 is axially pressed with thrush surface 22 of sleeve 21. At this time, the portion provided with female thread portion 14 of tubular body 11 of blind nut 10 is strongly pulled by thread bit 24 in the arrow direction B in FIG. 3, i.e. in the direction of the head portion 12, so that the portion not provided with female thread portion 14 of tubular body 11 may be plastic deformed in a direction of enlarging its diameter as is well known and further bent radially and expanded outwards to produce a flanged and expanding portion 16. As the result, the aperture surrounding portion of the object article 31 is sandwiched by head portion 12 and expanding portion 16 from above and below to thereby fasten blind nut 10 to object article 30. Fastening tool 20 once used to complete fastening of blind nut 10 to object article 30 is removed by rotating spindle 23 in the direction counter to arrow A and disengaging thread bit 24 from female thread portion 14. The so coupled blind nut 10 provides female thread portion 14 useful for a not shown bolt or the like. With respect to blind nut 10 as conventional, the upper half portion of tubular body 11, which portion is not provided with female thread portion 14, is uniform in thickness up to head portion 15. No matter how the head portion is i.e. flat or countersunk, its upper surface is plane normal to the axial direction. On the other hands, sleeve 21 of fastening tool 20 at a time of fastening operation is only operable to press axially the upper surface of head portion 12 with lower thrust surface 22 but not operable to work out in the direction normal to the axial direction, i.e. in the radial and outer direction. Moreover, since the outer diameter of spindle 23 is equal to the one of thread bit 24 or slightly larger and smaller than the inner bore 13 of tubular body 11, spindle 23 in couplement with blind nut 10 produces a gap 17 between its side and tubular body 11 as shown in FIG. 2. It is therefore noted that the part not provided with female thread portion 14 of tubular body 11 of the coupled blind nut 10 is restricted by thrust surface 22 of sleeve 21 and thread bit 24 of spindle 23 with respect to the axial direction but is in not restricted conditions as to the radial direction. Neck portion 15 is also in the same condition.

As the result, when thread bit 24 affords tubular body 11 an axial compressive load, specifically this load is added to female thread 14 in the interior of tubular body 11, the part not provided with female thread portion 14 is deformed excepting neck portion 15 in the radial and outer direction as shown in FIG. 3 to produce expanding portion 16. In contrast, neck portion 15 is deformed in the radial and inner direction to become a changed neck portion 15' in minor diameter. In the result, a slight gap 32 once produced from the inner peripheral side of lower aperture 31 is changed to a wider gap 32'. Fastening strength of blind nut 10 to object article 30, which is in a state of producing wider gap 32', specifically in respect of its turning direction, is provided in that the aperture surrounding portion is sandwiched by head portion 12 and expanding portion 16 under pressure. A degree of its strength depends on the pressure exerted therebetween. Deformed neck portion 15' acts only to connect head portion 12 with expanding portion 16 and is completely detached from the inner peripheral side of lower aperture 31, so that no production of sliding frictional resistance as well as of fastening strength with respect to the turning direction can be expected.

As in the foregoing, since it is very difficult to get sufficiently large fastening strength with respect to the turning direction of the coupled blind nut 10 against object article 30, when torque is given for a bolt to be screwed, there is a fear that both will jointly turn in many cases. In some cases where formation of expanding portion 16 is not satisfactory, it is difficult to fasten any bolt.

As settlement of the foregoing problem, it is known to propose that the lower surface of head portion 12 be radially pleated or the outer peripheral side of neck portion 15 be serrated. In the former case, when torque is given, head portion 12 is sometimes slipped slightly from the aperture surrounding portion and fastening strength in the turning direction can not be enhanced so much as expected. In the latter case, the neck portion is deformed as shown in FIG. 3 and detached from the inner peripheral side of aperture 31, improvement of the fastening strength can hardly be expected from the beginning.

In view of the foregoing problem, it is the major object of this invention to improve largely the fastening effect of a blind nut to an object article, particularly with respect to the turning direction. Accordingly, it is a first object of this invention to provide blind nut fastening methods by extending and deforming the neck portion of a blind nut in the radial and outer direction at fastening times.

It is a second object of this invention to provide a blind nut having the neck portion in a smaller thickness than the other part, thereby facilitating extension and deformation of the neck portion in the radial and outer direction.

It is, further, a third object of this invention to provide fastening tools having the lower end of a sleeve conically formed for advancing forcedly along the neck portion of a blind nut.

BRIEF DESCRIPTION OF THE DRAWINGS

The foregoing and other objects, features and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1 is a partially sectional side view of a prior art blind nut;

FIG. 2 is a partially sectional side view of the blind nut in a mode prior to its fastening;

FIG. 3 is a partially sectional side view of the blind nut in a mode after its fastening;

FIG. 4 is a partially sectional side view of a blind nut according to this invention;

FIG. 5 is a partially sectional side view of another blind nut according to this invention;

FIG. 6 is a sectional side view of the blind nut in FIG. 4 but in a mode prior to its fastening;

DETAILED DESCRIPTION OF THE DRAWINGS

Figure 9:
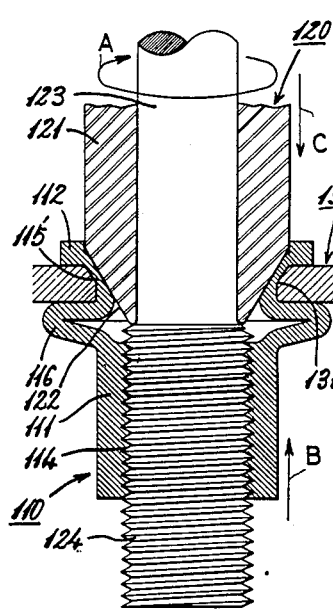
FIG. 9 is a sectional side view of the blind nut in FIG. 4 but in a mode after its fastening by use of the sleeve in FIG. 7.

A blind nut 110 shown in FIGS. 4 and 5, partially in a similar construction to blind nut 10 shown in FIG. 1, includes a tubular body 111 in a uniform outer diameter, a flanged head portion 112, and an inner bore having the lower half part provided with a female thread portion 114 in a smaller diameter than the rest of said inner bore. The neck portion 115 of tubular body 111 according to this blind nut 110, different from the conventional ones, is smaller in thickness than the other part of tubular body 111. As shown in FIG. 4, inner bore 113 of tubular body 111 includes along neck portion 115 a taper portion 113a opened conically upwards. Accordingly, the inner peripheral side of neck portion 115 is finished with a taper face 115a. For this, the thickness of neck portion 115 is changed gradually smaller toward head portion 112. In contrast, as shown in FIG. 5, inner bore 113 includes a wider straight portion 113b along neck portion 115.

Accordingly, the inner peripheral side of neck portion 115 is finished with a straight face 115b. For this, the thickness of neck portion 115 is uniformly smaller by way of a step than the other part of tubular body 111.

According to the embodiment shown in FIG. 5, since the thickness of neck portion 115 is uniformly small, radial and outer deformation of neck portion 115 at a fastening time is facilitated, but its mechanical strength as to resistance of neck portion 115 against a given torque is questionable.

In contrast, according to the embodiment shown in FIG. 4, the thickness of neck portion 115 is changed gradually smaller toward head portion 112, it may be required to afford a little stronger load for deforming the neck portion in the radial and outer direction but the mechanical strength in the above question is satisfactory.

Figure 10:
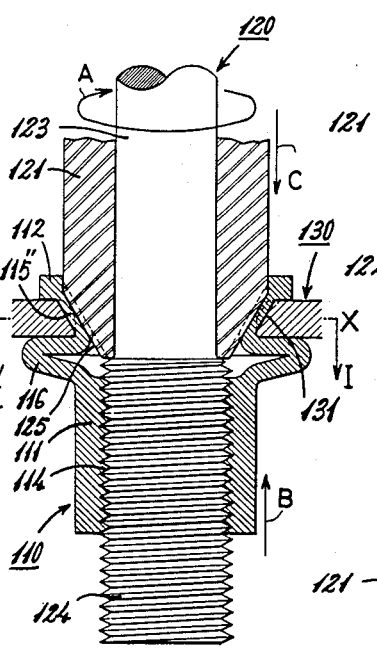
FIG. 10 is a sectional view of the blind nut in a mode after its fastening by use of the sleeve in FIG. 8.
Figure 7:
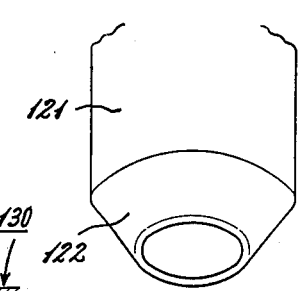
FIG. 7 is a perspective view of a sleeve of a fastening tool according to this invention.
Figure 8:
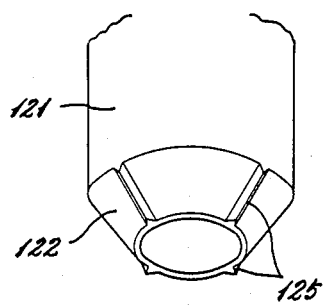
FIG. 8 is a perspective of another sleeve.
Figure 12:
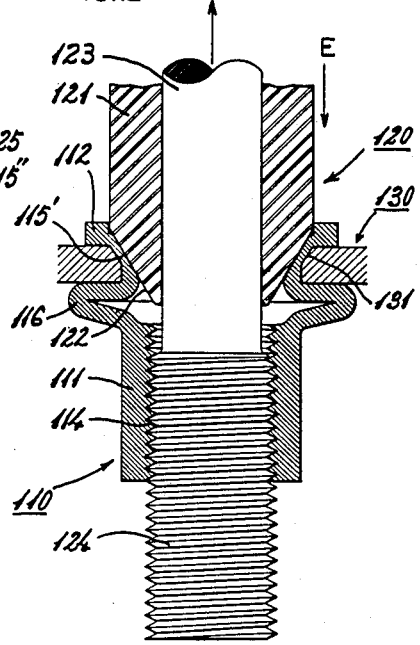
FIG. 12 is a partially sectional view showing another use mode of said fastening tool.

A tool 120 in use for fastening blind nut 110 in the foregoing construction is shown in FIGS. 6-8. Tool 120 includes a sleeve 121, a spindle 123 rotatably disposed through said sleeve 121, and a male thread bit 124 provided with the lower part of said spindle, as common in conventional tool 20. As evidently different from conventional tool 20, tool 120 includes a sleeve 121 having the lower end conically formed to provide a taper face 122. This taper face 122, different from thrust surface 22 normal to the axial direction as prior art sleeve 21, is designed operable not only in the axial and downward direction but also in the radial and outer direction. For this purpose, the lower conical portion of sleeve 121 is provided with a maximum outer diameter sufficiently larger than the one of neck portion 115 and with a minimum outer diameter sufficiently smaller than the diameter of inner bore 113. Sleeve 121 is no longer provided with a similar end face to conventional thrust surface 20. Sleeve 121 shown in FIG. 7 is provided with taper face 122 having no convex stripe thereon. As shown in FIG. 8, taper face 122 is provided with four convex stripes in an equal distance thereon. On the other hand, spindle 123 is, with respect to its lower portion small in a minimum outer diameter, thinner rather than the outer diameter of thread bit 124. Spindle 123 is independently rotatable relative to sleeve 121 and substantially not sliding in the axial direction relative thereto. In this way, the lower end of sleeve 121 is reached adjacent to thread bit 124, as shown in FIGS. 6, 9 and 10. On the other hands, when it is desired at the final stage of a fastening operation to draw spindle 123 out of sleeve 121 a little in the withdrawal direction, the lower end of sleeve 121 is designed to separate a little from thread bit 124, as in FIG. 12. Numeral 130 denotes an object article for fastening blind nut 110 together, having a lower aperture 131 pierced slightly larger than the outer diameter of tubular body 111, thereby to produce a slight gap 132 around neck portion 115 when blind nut 110 is inserted into lower aperture 131.

Fastening of blind nut 110 to object article 130 by means of tool 120 is carried out as follows:

Prior to insertion of blind nut 110 into lower aperture 131, blind nut 110 is made such that female thread portion 114 is sufficiently meshed with thread bit 124. At this time, the lower portion of sleeve 121 is advanced in the interior of neck portion 115, while its taper face 122 is butted on the upper inner peripheral side of said neck portion. This blind nut 110 as fixed with tool 120 is thereafter inserted into lower aperture 131 as shown in FIG. 6 when the lower surface of head portion 112 is seated on the upper surface of the aperture surrounding portion.

After blind nut 110 is set as in the foregoing, spindle 123 independently of tool 120 is rotated in an arrow direction A in FIG. 9, so that thread bit 124 can be further advanced along female thread portion 114. Blind nut 110 is then pressed with sleeve 121, so that the blind nut can not turn. The part provided with female thread portion 114 of tubular body 111 is strongly pulled by guide of thread bit 124 in an arrow direction B, so that the adjacent part not provided with female thread portion 114 can be plastic deformed, bent and expanded to produce a flanged expanding portion 116, as in the foregoing conventional device. Expanding portion 116 and head portion 112 sandwiches the aperture surrounding portion of object article 130 under pressure from above and below, thereby to achieve fastening of blind nut 110 to object article 130. On the other hand, when the part provided with female thread portion 114 of tubular body 111 is pulled in arrow direction B as shown, resisting forces against said pulling are transferred to spindle 123 by way of thread bit 125. In cases where spindle 123 is so restricted as not to slide axially relative to sleeve 121, sleeve 121 is strongly drawn in arrow direction C as shown in FIG. 9. For this, the lower conical portion of sleeve 121 is advanced in the interior of blind nut 110, while the interior of neck portion 115 is strongly pressed with the taper face 122. This press force operates on neck portion 115 not only in the axial and down directions, thereby to prevent floating of head portion 112 from the aperture surrounding portion, but also in the radial and outer direction. As a result, neck portion 115 is plastic deformed in the radial and outer direction while opened along taper face 122 and changed in a neck portion 115' in a larger diameter, so that a gap 132 with respect to the inner peripheral side of lower aperture 131 can be removed and further the upper corner portion of said inner peripheral side is deformed in a dish-shape to get touched around the neck portion under pressure.

Figure 11:
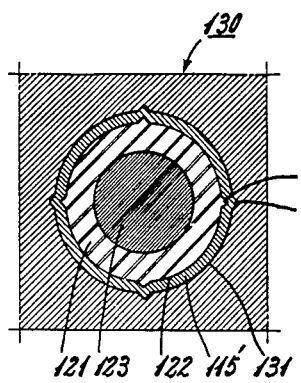
FIG. 11 is a sectional view taken along X—X in FIG. 10.

In the case where taper face 122 is provided with convex stripes as shown in FIG. 8, the part opposed to convex stripes 125 of the deformed neck portion 115' is additionally pressed with said stripes 125 to provide striped lugs 115'' as shown in FIGS. 10 and 11. Striped lugs 115'' are forced to deform the inner peripheral side and then fixed therein. In cases where the lower ends of sleeve 121 is separated a little from thread bit 124, the separate state can be maintained still at the final stage of said fastening operation as in FIG. 12. For this reason, the expanding neck portion 115' can be strongly pressed to the inner peripheral side 131 of the aperture surrounding portion, as well as fit-in of convex stripes 115'' can be reinforced, such that sleeve 121 is pressed in arrow direction C while spindle 123 is instantly pulled strongly in arrow direction Fastening strength of blind nut 110 to object article 130, particularly in the turning direction, can be obtained such that the lower aperture surrounding portion is sandwiched under pressure by head portion 112 and expanding portion 116 as in the prior art device. This strength is further reinforced such that neck portion 115 is expanded in the radial and outer direction, according to this invention. Since the expanding neck portion 115' is strongly pressed to the inner peripheral side 131 of the aperture surrounding portion, very large sliding frictional resisting forces in the turning direction can be expected. Accordingly, fastening strength is added by said resisting forces. In addition, in cases convex stripes 115'' are provided on the outer surface of neck portion 115', fastening strength to the turning direction is still further reinforced, inasmuch as convex stripes 115'' are fixed in the inner peripheral side of the aperture surrounding portion.

Fastening of blind nut 110 is completed by means of tool 120, spindle 123 is rotated in the direction counter to arrow A, thereby to remove tool 120. As the result, blind nut 110 fastened to object article 130 is used to couple with a not shown bolt by means of its female thread portion 114.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A blind nut fastening method comprising:
using: a blind nut including a tubular body having a uniform outer diameter, a flanged head portion extending outwardly at an upper end of said tubular body, an inner bore through said tubular body having an unthreaded thinner neck portion at an upper section of the bore end and a female threaded portion at a lower section of said bore with a smaller diameter than said unthreaded neck portion; a separate cylindrically-shaped sleeve having a lower frusto-conical-formed inwardly-beveled end whose maximum outer diameter at the outer surface of said sleeve is substantially larger than the inner diameter of the bore of the neck portion of said blind nut, and the minimum outer diameter approximately at a bore through said sleeve is smaller than said inner diameter of said bore, said beveled end being longer in the axial direction than the thickness of an object to which said blind nut is to be fastened; said beveled end being free to slide into said bore of said blind nut at said neck portion for expanding said neck portion; and, an elongated shaft-shaped spindle having male threads at one end thereof engagable with the female threads of said blind nut;
inserting said blind nut into an aperture of an object article;
inserting said spindle through said sleeve and into said blind nut and thereafter rotating said spindle so that said male threads of said spindle mesh with said female threads of said nut to thereby pull said lower section of said inner bore toward said head portion for expanding and deforming the part not provided with said female thread portion of said tubular body in the radial and external direction and for simultaneously driving said conical beveled end of said cylindrically-shaped sleeve down between said neck portion of said nut and the elongated shaft-shaped spindle to expand and deform said neck portion of said tubular body disposed adjacent to said aperture for the entire length of said aperture, thereby butting the resulting expanding portion against the inner peripheral side of said object article.

2. A blind nut fastening method as in claim 1, wherein said conically-formed, inwardly-beveled end of said sleeve has convex stripes thereon for causing increased deformation of said neck portion at said stripes.

* * * * *